(12) United States Patent
Dunlop et al.

(10) Patent No.: US 7,730,270 B2
(45) Date of Patent: *Jun. 1, 2010

(54) METHOD COMBINING ONCE-WRITEABLE AND REWRITEABLE INFORMATION STORAGE TO SUPPORT DATA PROCESSING

(75) Inventors: Neil A. Dunlop, Linlithgow (GB); Kevin P. Kealy, Edinburgh (GB)

(73) Assignee: SanDisk Corporation, Milpitas, CA (US)

( * ) Notice: Subject to any disclaimer, the term of this patent is extended or adjusted under 35 U.S.C. 154(b) by 589 days.

This patent is subject to a terminal disclaimer.

(21) Appl. No.: 11/529,582

(22) Filed: Sep. 29, 2006

(65) Prior Publication Data

US 2008/0082768 A1    Apr. 3, 2008

(51) Int. Cl.
*G06F 12/00*   (2006.01)
(52) U.S. Cl. ...................................... 711/161
(58) Field of Classification Search ........................ None
See application file for complete search history.

(56) References Cited

U.S. PATENT DOCUMENTS

| | | | |
|---|---|---|---|
| 5,218,685 A * | 6/1993 | Jones | 711/160 |
| 5,887,145 A | 3/1999 | Harari et al. | |
| 6,070,226 A * | 5/2000 | Freeman et al. | 711/117 |
| 6,075,706 A | 6/2000 | Learmonth et al. | |
| 6,226,202 B1 | 5/2001 | Kikuchi et al. | |
| 6,523,132 B1 | 2/2003 | Harari et al. | |
| 6,545,891 B1 | 4/2003 | Tringali et al. | |
| 6,584,541 B2 | 6/2003 | Friedman et al. | |
| 6,612,498 B1 | 9/2003 | Lipponen et al. | |
| 6,711,043 B2 | 3/2004 | Friedman et al. | |
| 6,765,813 B2 | 7/2004 | Scheuerlein et al. | |
| 6,768,661 B2 | 7/2004 | Vyvoda et al. | |
| 6,824,063 B1 | 11/2004 | Wallace et al. | |
| 6,839,262 B2 | 1/2005 | Vyvoda et al. | |
| 6,996,660 B1 | 2/2006 | Moore et al. | |
| 7,003,619 B1 | 2/2006 | Moore et al. | |
| 7,062,602 B1 | 6/2006 | Moore et al. | |
| 7,114,659 B2 | 10/2006 | Harari et al. | |
| 7,136,883 B2 * | 11/2006 | Flamma et al. | 707/204 |
| 7,162,549 B2 | 1/2007 | Mambakkam et al. | |

(Continued)

FOREIGN PATENT DOCUMENTS

EP        0 273 665        7/1988

(Continued)

OTHER PUBLICATIONS

U.S. Appl. No. 09/877,691; "Method For Re-Directing Data Traffic In A Write-Once Memory Device;" inventors: J. James Tringali, Christopher S. Moore, Roger W. March, James E. Schneider, Derek J. Bosch, And Daniel C. Steere; filed Jun. 8, 2001.

(Continued)

*Primary Examiner*—Hiep T Nguyen
(74) *Attorney, Agent, or Firm*—Brinks Hofer Gilson & Lione

(57) ABSTRACT

An information storage arrangement that combines rewriteable storage with one-time programmable (OTP) storage is managed in a manner that makes judicious use of the OTP storage. It is therefore possible to exploit the economic advantage associated with OTP storage, while also avoiding storage capacity losses that would otherwise be associated with OTP storage.

21 Claims, 3 Drawing Sheets

U.S. PATENT DOCUMENTS

| | | | |
|---|---|---|---|
| 7,441,096 B2 * | 10/2008 | Kitamura | 711/203 |
| 2002/0085404 A1 | 7/2002 | Lu et al. | |
| 2002/0184459 A1 | 12/2002 | Taussig et al. | |
| 2003/0095484 A1 | 5/2003 | Motohashi | |
| 2003/0145141 A1 | 7/2003 | Chen et al. | |
| 2006/0047920 A1 | 3/2006 | Moore et al. | |
| 2008/0244203 A1 | 10/2008 | Gorobets et al. | |

FOREIGN PATENT DOCUMENTS

| | | |
|---|---|---|
| EP | 0 757 317 | 2/1997 |
| EP | 1 327 957 A1 | 7/2003 |
| EP | 1 462 927 | 9/2004 |
| GB | 2374204 | 10/2002 |
| WO | WO 2008/042068 A | 4/2008 |

OTHER PUBLICATIONS

U.S. Appl. No. 11/496,985; "Multi-Use Memory Cell and Memory Array;" inventors: Roy Scheuelein and Tanmay Kumar; filed Jul. 31, 2006.

U.S. Appl. No. 11/496,984; "Method for Using a Multi-Use Memory Cell and Memory Array;" inventors: Roy Scheuelein and Tanmay Kumar; filed Jul. 31, 2006.

U.S. Appl. No. 11/496,874; "Mixed-Use Memory Array;" inventors: Roy Scheuelein; filed Jul. 31, 2006.

U.S. Appl. No. 11/496,983; "Method for Using a Mixed-Use Memory Array;" inventors: Roy Scheuelein; filed Jul. 31, 2006.

U.S. Appl. No. 11/496,870; "Mixed-Use Memory Array with Different Data States;" inventors: Roy Scheuelein and Christopher Petti; filed Jul. 31, 2006.

U.S. Appl. No. 11/497,021; "Method for Using a Mixed-Use Memory Array with Different Data States;" inventors: Roy Scheuelein and Christopher Petti; filed Jul. 31, 2006.

International Search Report and Written Opinion for PCT/US2008/003112, dated Jun. 4, 2008, 10 pages.

International Search Report and Written Opinion for PCT/US2008/002615, dated Aug. 13, 2008, 9 pages.

"SanDisk microSD™ Cards," 1 page, 2007.

"SanDisk Sansa® Connect™ MP3 Player," 1 page, 2007.

The International Search Report and the Written Opinion for PCT/US2007/019365 dated Apr. 2, 2008, 10 pages.

Office Action for U.S. Appl. No. 11/731,511, dated Mar. 17, 2009, 14 pages.

Office Action for U.S. Appl. No. 11/529,555, dated May 6, 2009, 10 pages.

Office Action for U.S. Appl. No. 11/731,523, dated Oct. 31, 2008, 18 pages.

Office Action for U.S. Appl. No. 11/731,531, dated Oct. 29, 2008, 11 pages.

* cited by examiner

US 7,730,270 B2

METHOD COMBINING ONCE-WRITEABLE AND REWRITEABLE INFORMATION STORAGE TO SUPPORT DATA PROCESSING

FIELD OF THE INVENTION

The invention relates generally to data processing and, more particularly, to information storage in data processing systems.

BACKGROUND OF THE INVENTION

Data processing systems are ubiquitous in modern society. Information storage is of course a critical feature in a data processing system. Factors such as the capacity, cost, and physical size of the information storage facilities of a data processing system impose limitations on its functional capabilities. Considerations such as these are especially critical in the case of data processing systems that are implemented in mobile devices. Some well-known examples of the myriad of mobile devices that utilize data processing systems include cellular telephones, digital cameras, and other mobile personal computing devices, such as, for example, personal digital assistants, palm pilots, audio players, video players, and game playing devices.

It is desirable in view of the foregoing to provide for improvements in data processing systems with respect to limiting factors such as those mentioned above.

DETAILED DESCRIPTION

Figure 1:
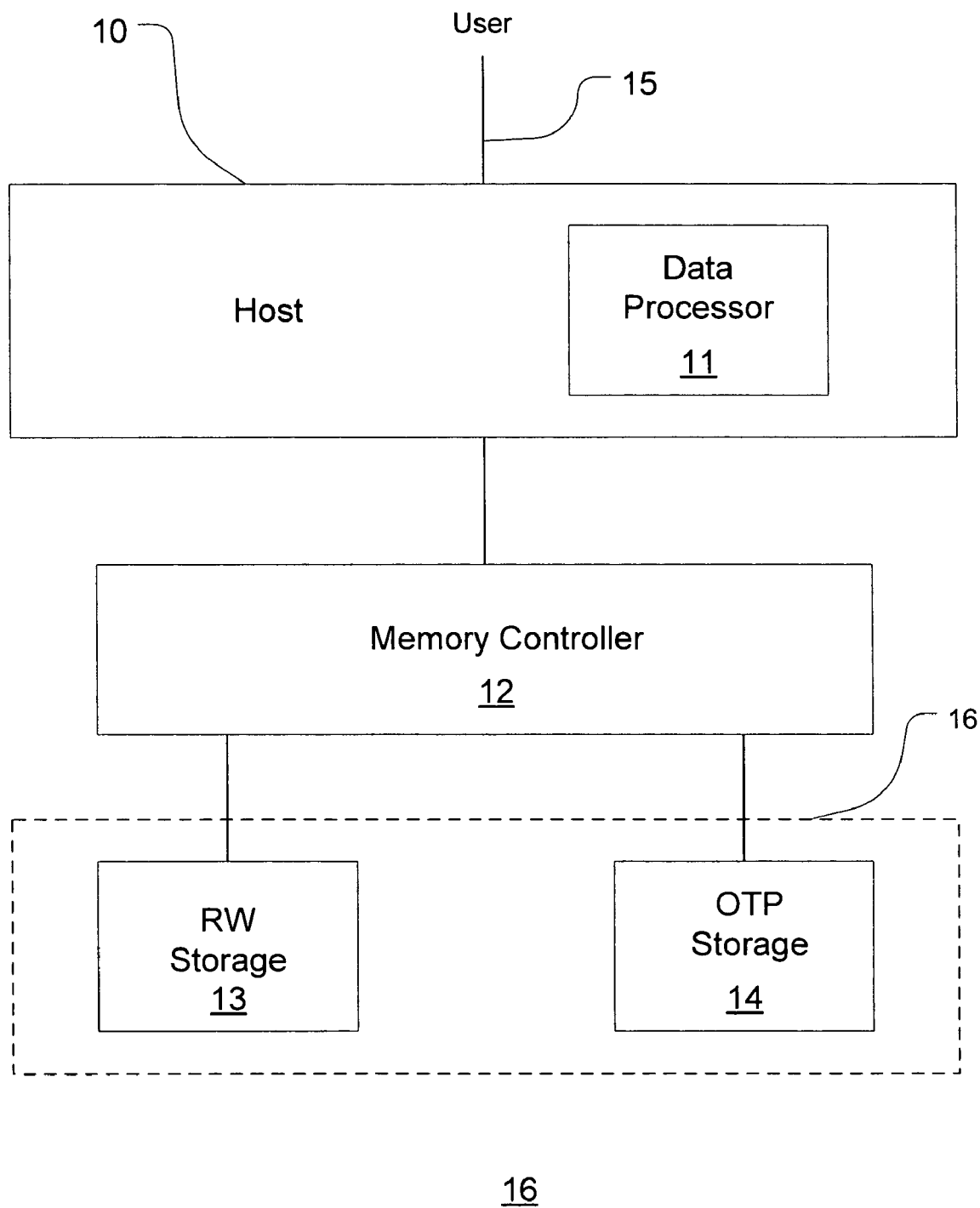
FIG. 1 diagrammatically illustrates a data processing system according to exemplary embodiments of the invention.

FIG. 1 diagrammatically illustrates a data processing system according to exemplary embodiments of the invention. The data processing system of FIG. 1 includes a host 10 with a data processor 11 provided therein. The host 10 is accessible to a user via a user interface shown generally at 15. The host 10 is connected to a memory controller 12. The memory controller 12 is also connected to an information storage arrangement 16 that includes a rewriteable (RW) information storage apparatus 13 and a one-time programmable (OTP) information storage apparatus 14. Information used by the host 10 (e.g., by the data processor 11) is written to and read from the information storage arrangement by the memory controller 12. In some embodiments, the RW information storage apparatus 13 and the OTP information storage apparatus 14 provide non-volatile information storage. The RW information storage apparatus 13 includes memory elements that can be written to as often as desired. In some embodiments, the RW information storage apparatus 13 is a flash memory apparatus. The OTP information storage apparatus 14 is defined by memory elements that can be written to only once.

In some embodiments, the memory controller 12 and the information storage arrangement 16 are provided together as a unit that is configured for removable connection to the host apparatus 10. In some embodiments, the removably connectable unit is a "memory stick". In some embodiments, the removably connectable unit is a printed circuit card. In some embodiments, the memory controller 12 and the information storage arrangement 16 are provided on a printed circuit card together with at least the data processor 11. In various embodiments, the data processing system of FIG. 1 is provided in mobile devices such as the examples given above.

According to exemplary embodiments of the invention, the memory controller 12 manages the information storage arrangement 16 in a manner that makes judicious use of the OTP information storage apparatus 14. The OTP storage at 14 has a lower financial cost than the RW storage at 13, but the OTP storage loses available capacity whenever information already stored therein must be modified. This is because the OTP storage capacity occupied by the already-stored information cannot be re-used to store the modified information (or any other information). The judicious use of OTP storage makes it possible to exploit the economic advantage associated with OTP storage, while also avoiding storage capacity losses that would otherwise be associated with OTP storage.

In some embodiments, if the amount of available storage capacity in the RW information storage apparatus 13 reaches a predetermined lower limit threshold, then the controller 12 performs an information archive operation to increase the available storage capacity in the RW information storage apparatus 13. In this information archive operation, the controller 12 retrieves information that is currently stored in the RW information storage apparatus 13, and writes the retrieved information to the OTP information storage apparatus 14, thereby increasing the available storage capacity in the RW information storage apparatus 13. In some embodiments, the controller 12 selects the information that is archived from the RW information storage apparatus 13 to the OTP information storage apparatus 14 based on a predetermined selection condition or criterion.

In some embodiments, the controller 12 implements a conditional OTP write operation with respect to information that the controller 12 receives from the host 10 for storage. According to this conditional OTP write operation, if the received information satisfies a predetermined condition or criterion, then the controller 12 writes that information to the OTP information storage apparatus 14. On the other hand, if the received information does not satisfy the condition, then the controller 12 writes the information to the RW information storage apparatus 13.

Considering the aforementioned information archive operation in more detail, the controller 12 can use conventional techniques to monitor the available storage capacity in the RW information storage apparatus 13. As indicated above, the controller 12 can, in some embodiments, initiate the aforementioned information archive operation upon detecting a condition wherein the available storage capacity in the RW information storage apparatus 13 is undesirably low (i.e., the RW information storage apparatus 13 is considered to be too full). For example, the controller 12 can initiate the information archive operation if the controller detects that the available storage capacity in the RW information storage apparatus 13 has fallen below a lower limit threshold capacity.

As mentioned above, in the information archive operation, the controller 12 retrieves from the RW information storage apparatus 13 information which is already stored in the RW information storage apparatus 13, and which satisfies a selection condition. The controller 12 writes the retrieved information to the OTP information storage apparatus 14, thereby making available the space that the archived information previously occupied in the RW information storage apparatus 13.

According to exemplary embodiments of the invention, the selection condition used in the information archive operation is designed to select information that can be characterized as relatively unlikely to be changed (or deleted).

In some embodiments, information in the RW information storage apparatus 13 is selected for archiving based on the access history of the information. Such access history is available according to conventional data processing and memory controller operations. Some embodiments use write access history. Some embodiments use read access history. Various embodiments use various combinations of write access history and read access history. Some embodiments select the least frequently accessed information for archiving. Some embodiments select the least recently accessed information for archiving.

Various embodiments select information for archiving based on various combinations of the aforementioned most-frequently-accessed criterion and the aforementioned least-recently-accessed criterion. As an example, first information, having an associated first access frequency that is higher than a second access frequency associated with second information, might nevertheless be selected for archiving instead of the second information if, for example, the most recent access of the second information occurred more recently than the most recent access of the first information.

Figure 2:
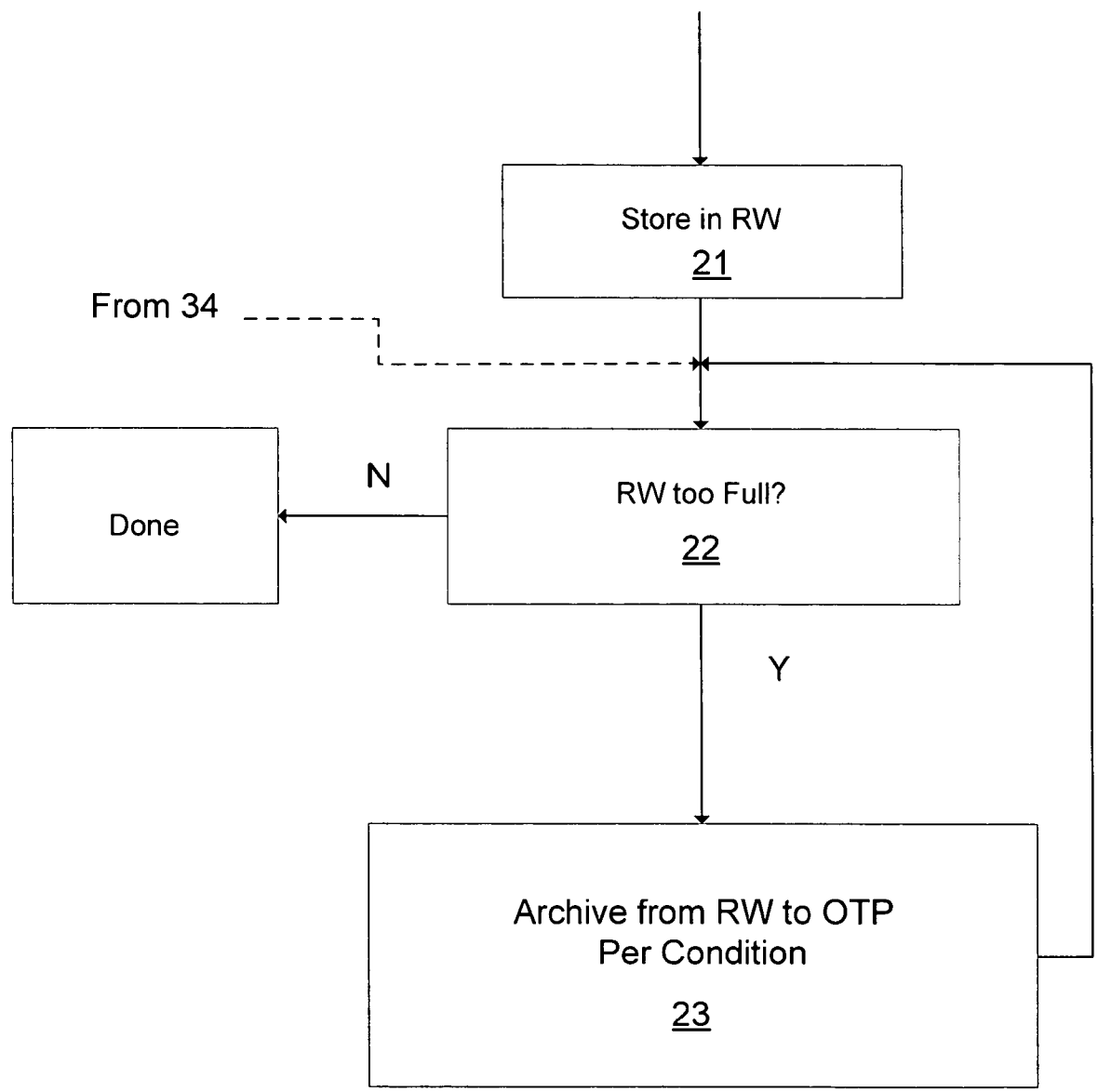
FIG. 2 illustrates exemplary operations that can be performed to implement an information archive operation according to exemplary embodiments of the invention.

FIG. 2 illustrates exemplary operations associated with execution of the aforementioned information archive operation according to exemplary embodiments of the invention. In some embodiments, the memory controller 12 of FIG. 1 is capable of performing the operations shown in FIG. 2. As shown in the example of FIG. 2, when information is presented for storage, that information is stored in RW storage at 21. It is then determined at 22 whether or not the RW storage is considered to be too full, using, for example, a predetermined threshold as described above. If RW storage is too full at 22, then information in RW storage is selected and archived to OTP storage as shown at 23. The information can be selected for archiving at 23, for example, according to any of the exemplary archive selection criteria described above. The archiving operation can be repeated at 23 as necessary until it is determined at 22 that the RW storage is no longer considered to be too full. Whenever it is determined that RW is not too full at 22, then operations are complete at 24.

Turning now to a more detailed consideration of the aforementioned conditional OTP operation, this operation, as mentioned above, writes received information to the OTP information storage apparatus 14 (referencing FIG. 1 again), if the received information has a characteristic that satisfies a predetermined criterion. If the received information does not have a characteristic that satisfies the predetermined criterion, then the information will be written to the RW information storage apparatus 13. Some examples of characteristics that can satisfy the criterion for the conditional OTP write operation are described below.

According to exemplary embodiments of the invention, information that can be characterized as relatively unlikely to be changed (or deleted), or not expected to be changed (or deleted), can be stored in the OTP information storage apparatus 14, while information that can be characterized as relatively likely to be changed (or deleted), or expected to be changed (or deleted), can be stored in the RW information storage apparatus 13. For example, information files such as image files, music files and book files can be stored in the OTP information storage apparatus 14, while metadata associated with such files (e.g., file names, MP3 tag information, play lists, bookmarks, addendum, free media, short term media and regularly updated media) can be stored in the RW information storage apparatus 13. The information formats associated with conventional data processing techniques enable the controller 12 to distinguish between files and their associated metadata. As a further example, a game program can be stored in the OTP information storage apparatus 14, while game saves associated with execution of the game program can be stored in the RW information storage apparatus 13.

As another example, the logical block address (LBA) that the host 10 has assigned to the information is a characteristic that can serve as an indicator of where to store the information. If it is expected that information with a relatively high LBA (or an LBA above a certain value) will be changed relatively infrequently (if at all), and that information with a relatively low LBA (or an LBA below a certain value) will be changed relatively frequently, then the former information can be written to the OTP information storage apparatus 14, and the latter information can be written to the RW information storage apparatus 13. For example, in some conventional systems, information that changes frequently, such as a file allocation table (FAT file), is typically assigned to the relatively low LBA area. In that case, the relatively low LBA of the frequently changed information would trigger storage of that information in the RW information storage apparatus 13.

As a further example, a conventional file setting provided by the data processor 11 can be defined as a "read-only" setting to indicate that the associated file is to be stored in the OTP information storage apparatus 14.

In various embodiments, the controller 12 utilizes various sets of the above-described exemplary characteristics to determine whether an OTP write operation will be performed. In a given embodiment, if the information to be stored has any one of the characteristics within the set of characteristics that is being used in that embodiment, then the information is written to the OTP information storage apparatus 14.

In some embodiments, all information received from the data processor 11 is stored in the OTP information storage apparatus 14, while memory control structures used internally by the memory controller 12 are stored in the RW information storage apparatus 13.

In some embodiments, the user can direct that certain information is to be stored in the OTP information storage apparatus 14. For instance, the user of a digital camera may decide that a particular image is to be saved. This user decision indicates to the controller 12 that the image is to be stored in the OTP information storage apparatus 14. Images that the user does not select for saving can be stored in the RW information storage apparatus 13. In some embodiments, the host 10 includes a user-assistance application (e.g., running on the data processor 11) that assists the user in deciding where to store information. Some embodiments facilitate the use of such a user-assistance application by implementing, within the data processor 11, logical partitioning that is aligned with the physical partitioning defined by the RW information storage apparatus 13 and the OTP information storage apparatus 14. In such embodiments, the OTP information storage apparatus 14 is managed as a write-once, read-many partition.

It should also be noted with respect to FIG. 1 that, although the RW information storage apparatus 13 and the OTP information storage apparatus 14 represent two physical partitions, there is no limit to the number of logical partitions that can be used in various embodiments.

In embodiments wherein the information storage arrangement 16 is provided as a unit for removable connection to the host 10, and wherein a user-assistance application is used, the host 10 and the removable unit 16 cooperate (according to any suitable conventional technique) to enable the host 10 to recognize that the removable unit includes both the RW information storage apparatus 13 and the OTP information storage apparatus 14. This recognition can be used by the host 10 to trigger execution of the user-assistance application.

Figure 3:
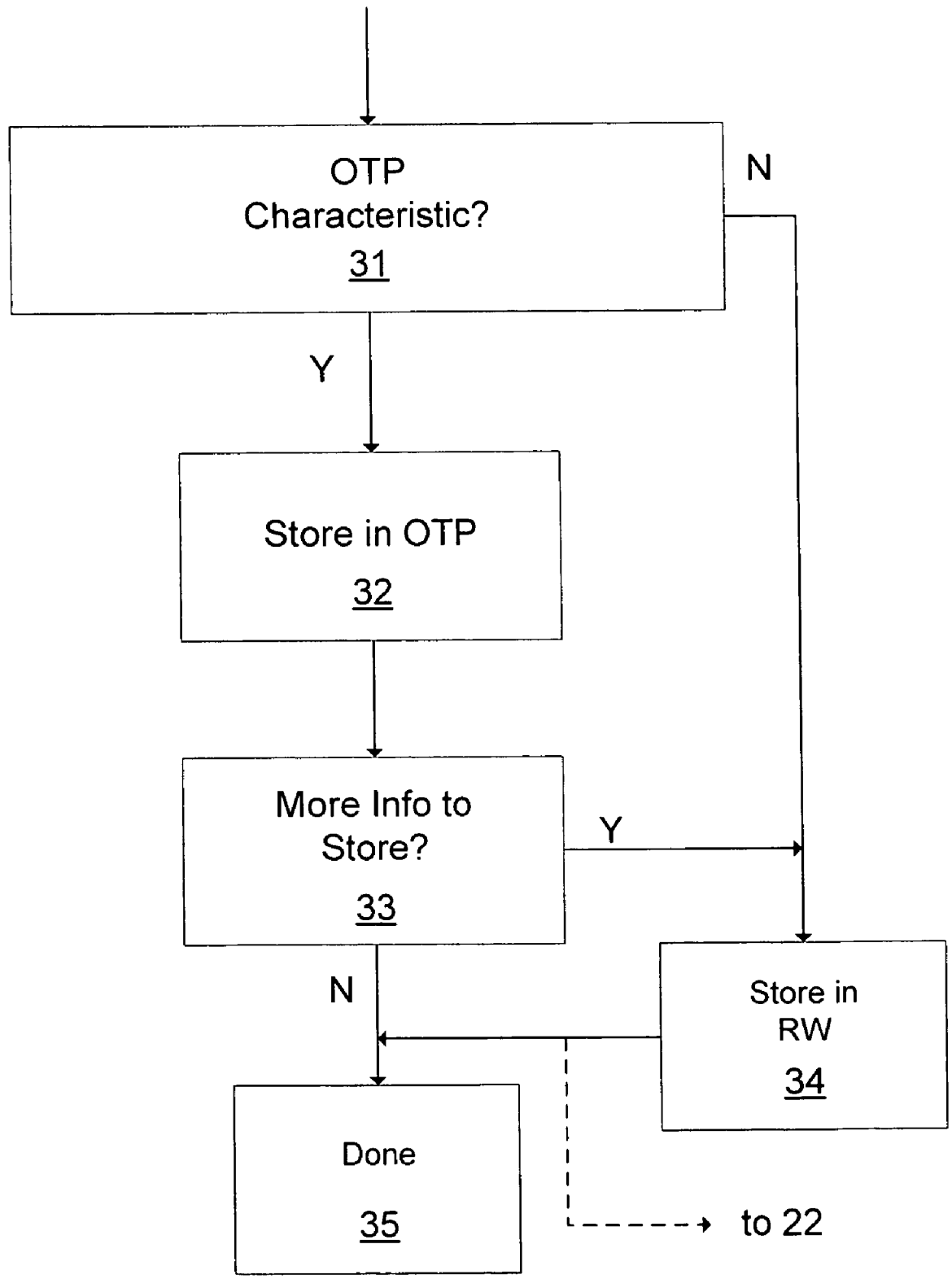
FIG. 3 illustrates exemplary operations that can be performed to implement a conditional write operation according to exemplary embodiments of the invention.

FIG. 3 illustrates exemplary operations associated with execution of the aforementioned conditional OTP write operation according to exemplary embodiments of the invention. In some embodiments, the memory controller 12 of FIG. 1 is capable of performing the operations shown in FIG. 3. When information is presented for storage, it is determined at 31 whether any of that information has associated therewith a characteristic that makes it suitable for OTP storage, for example, any of the exemplary characteristics described above. If not, then the information is stored in RW storage at 34, after which operations are complete at 35. If a characteristic that makes the presented information suitable for OTP storage is detected at 31, then the information (e.g., a music file) is stored in OTP storage at 32. Thereafter, it is determined at 33 whether any of the presented information remains to be stored, that is, whether any of the presented information (e.g., a play list) does not have a characteristic that makes it suitable for OTP storage. If it is determined at 33 that no information to be stored remains, then operations are complete at 35. If it is determined at 33 that information to be stored does remain, then the remaining information is stored in RW storage at 34, after which operations are complete at 35.

The broken lines in FIGS. 2 and 3 illustrate combined use of both the information archive operation and the conditional OTP write operation according to exemplary embodiments of the invention. In some embodiments, the controller 12 of FIG. 1 is capable of performing the combined operations illustrated by broken line in FIGS. 2 and 3. Referencing FIG. 3, after any needed OTP write operation has been completed at 32, and/or any needed RW storage operation has been completed at 34, operations proceed to 22 in FIG. 2, where it is determined whether RW storage is considered to be too full. If so, then the information archive operation is triggered and performed as described above.

Referencing FIG. 1 again, various embodiments use various ratios of OTP storage capacity to RW storage capacity. These various ratios represent various trade offs between cost, flexibility and the data processing needs of the host 10.

Although exemplary embodiments of the invention have been described above in detail, this does not limit the scope of the invention, which can be practiced in a variety of embodiments.

What is claimed is:

1. A method for archiving information from a rewritable memory to a one-time-programmable memory, the method comprising:
   (a) determining if available storage capacity in a rewritable memory is at a threshold amount;
   (b) if the available storage capacity in the rewritable memory is at the threshold amount:
      (b1) retrieving information stored in the rewritable memory; and
      (b2) writing the information in a one-time-programmable memory;
   wherein the rewritable memory is a flash memory device, and wherein the rewritable memory and the one-time-programmable memory are provided together as a unit that is configured for removable connection to a mobile host apparatus.

2. The method of claim 1 further comprising:
   making available locations in the rewritable memory that store the information.

3. The method of claim 1 further comprising:
   selecting the information to retrieve from the rewritable memory.

4. The method of claim 3, wherein the information is selected based on a selection condition.

5. The method of claim 4, wherein the selection condition comprises likelihood to change.

6. The method of claim 4, wherein the selection condition comprises likelihood to be deleted.

7. The method of claim 4, wherein the selection condition comprises access history of the information.

8. The method of claim 7, wherein the access history comprises write access history.

9. The method of claim 7, wherein the access history comprises read access history.

10. The method of claim 7, wherein the access history comprises a combination of write access history and read access history.

11. The method of claim 4, wherein the selection condition comprises a least-frequently-accessed criterion.

12. The method of claim 4, wherein the selection condition comprises a least-recently-accessed criterion.

13. The method of claim 4, wherein the selection condition comprises a combination of a most-frequently-accessed criterion and a least-recently-accessed criterion.

14. The method of claim 1 further comprising repeating (a) and (b).

15. The method of claim 1 further comprising, before (a), determining that the information should be stored in the rewritable memory instead of the one-time-programmable memory.

16. The method of claim 1, wherein the rewritable memory and the one-time-programmable memory are physical partitions of a memory.

17. A method for archiving information from a rewritable memory to a one-time-programmable memory, the method comprising:
   (a) determining if a rewritable memory is too full;
   (b) if the rewritable memory is too full:
      (b1) selecting information to retrieve from the rewritable memory;
      (b2) retrieving the information from the rewritable memory;
      (b3) writing the information in a one-time-programmable memory; and
      (b4) making available locations in the rewritable memory that store the information;
   wherein the rewritable memory is a flash memory device, and wherein the rewritable memory and the one-time-programmable memory are provided together as a unit that is configured for removable connection to a mobile host apparatus.

18. The method of claim 17, wherein the information is selected based on one or more of the following: likelihood to change, likelihood to be deleted, access history, write access history, read access history, a combination of write access history and read access history, a least-frequently-accessed criterion, a least-recently-accessed criterion, and a combination of a most-frequently-accessed criterion and a least-recently-accessed criterion.

19. The method of claim 17 further comprising repeating (a) and (b).

20. The method of claim 17 further comprising, before (a), determining that the information should be stored in the rewritable memory instead of the one-time-programmable memory.

21. The method of claim 17, wherein the rewritable memory and the one-time-programmable memory are physical partitions of a memory.

* * * * *